US010839387B2

(12) United States Patent
Newman et al.

(10) Patent No.: US 10,839,387 B2
(45) Date of Patent: Nov. 17, 2020

(54) BLOCKCHAIN BASED ACTION AND BILLING

(71) Applicant: ADP, LLC, Roseland, NJ (US)

(72) Inventors: Kurt Newman, Columbus, GA (US); Debashis Ghosh, Charlotte, NC (US); Robert Wohlers, Castro Valley, CA (US)

(73) Assignee: ADP, LLC, Roseland, NJ (US)

(*) Notice: Subject to any disclaimer, the term of this patent is extended or adjusted under 35 U.S.C. 154(b) by 4 days.

(21) Appl. No.: 16/248,661

(22) Filed: Jan. 15, 2019

(65) Prior Publication Data

US 2020/0226591 A1    Jul. 16, 2020

(51) Int. Cl.
*G06Q 40/00* (2012.01)
*G06Q 20/38* (2012.01)
*G06Q 20/14* (2012.01)
*G06Q 20/32* (2012.01)

(52) U.S. Cl.
CPC ........... *G06Q 20/389* (2013.01); *G06Q 20/14* (2013.01); *G06Q 20/325* (2013.01); *G06Q 20/3276* (2013.01); *G06Q 40/00* (2013.01)

(58) Field of Classification Search
CPC .................................................... G06Q 40/00
See application file for complete search history.

(56) References Cited

U.S. PATENT DOCUMENTS

| | | | |
|---|---|---|---|
| 9,953,281 B2 | 4/2018 | Wiig et al. | |
| 9,992,028 B2 | 6/2018 | Androulaki et al. | |
| 10,007,913 B2 | 6/2018 | Ebrahimi | |
| 10,026,082 B2 | 7/2018 | Davis | |
| 2014/0046818 A1* | 2/2014 | Chung | G06Q 40/00 705/35 |
| 2015/0287026 A1* | 10/2015 | Yang | G06Q 20/06 705/69 |
| 2017/0013047 A1 | 1/2017 | Hubbard et al. | |
| 2018/0189755 A1 | 7/2018 | Kilpatrick | |
| 2018/0225660 A1* | 8/2018 | Chapman | G06Q 20/10 |

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, p. 1-10 (Year: 2017).*
Neisse et al., "A Blockchain-based Approach for Data Accountability and Provenance Tracking," European Commission Joint Research Centre, 2017, 9 pages.
Vo et al., "Research Directions in Blockchain Data Management and Analytics," Open Proceedings, 2018, pp. 445-448.

* cited by examiner

*Primary Examiner* — I Jung Liu
(74) *Attorney, Agent, or Firm* — Yee & Associates, P.C.

(57) ABSTRACT

A method, computer system, and computer program product are provided for automatically causing an action to be performed and a payment for the action to be made in a blockchain environment. The blockchain environment receives a transaction. The transaction is configured to activate a smart contract. In response to being activated by the transaction, the smart contract issues a message within the blockchain environment. The message causes the action to be performed at a location device and an indication of the payment for the action to be rendered on a display of a device.

12 Claims, 12 Drawing Sheets

US 10,839,387 B2

BLOCKCHAIN BASED ACTION AND BILLING

BACKGROUND INFORMATION

1. Field

The present disclosure relates to a computer network for use with distributed ledgers and, more specifically, to devices for automatically causing an action to be performed and a payment for the action to be made in a blockchain environment.

2. Background

More and more transactions are conducted by credit card, cell phone, and computers using software involving a number of steps between a transaction, a debit to a user's account, and an action taken as a result of the debit to the user's account. Moreover, different transactions involve different devices and different software.

Actions to be taken may cover many different types of transactions. For example, a person may desire to pay for and gain admission to a ride at an amusement park, to pay for and gain admission to a concert, to pay for gasoline at a pump, or to purchase an item or service.

Such a plethora of transactions requires accurate accounting and record-keeping. A distributed ledger is a computer-only technology that enables the distributed recordation of transactions in a blockchain maintained by a network of computers in a blockchain environment.

A need exists for a way to automatically cause an action to be performed and a payment for the action to be made in a blockchain environment.

SUMMARY

The illustrative embodiments provide for a computer-implemented method for automatically causing an action to be performed and a payment for the action to be made in a blockchain environment. A transaction is received in the blockchain environment. The transaction is configured to activate a smart contract. In response to being activated by the transaction, the smart contract issues a message within the blockchain environment, wherein the message causes the action to be performed and an indication of the payment for the action to be rendered on a display of a device.

The illustrative embodiments also contemplate a computer configured to execute program code which implements this method. The illustrative embodiments also contemplate a non-transitory computer-recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
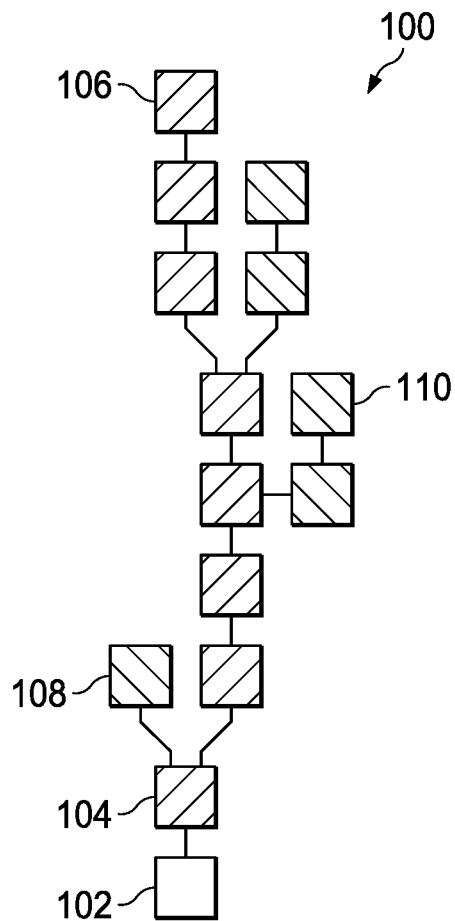
FIG. 1 is an illustration of a distributed ledger in a form of a blockchain in accordance with an illustrative embodiment.

The illustrative embodiments recognize and take into account that a billing system for an action may employ technology of blockchains and smart contracts to create an open and secure billing system.

A distributed ledger, as used throughout this document, refers to a computer-only technology that enables the distributed recordation of transactions through a distributed ledger maintained by a network of computers. A blockchain is an example of a distributed ledger. BITCOIN® is an example of a blockchain technology application.

A blockchain is a type of distributed ledger, which includes digitally recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as BITCOIN®, where there is no limitation on who may participate in the network, or private, where only approved parties are permitted to participate in the network.

The illustrative embodiments recognize and take into account that billing and payment may be affected by a number of smart contracts in a blockchain environment.

As used herein, an "action" is a desired result that a user gains by allowing a user device to connect to a location device either by a wireless connection or by scanning a barcode into the location device. The illustrative embodiments can include paying for and gaining admission to a ride at an amusement park, paying for and gaining admission to a concert, paying for and receiving a service consumption such as gasoline at a pump, or features of software usage. In these illustrative embodiments, an action is taken after payment for the action so that in each case, the person does not have to do anything other than carry a user device, such as a smart phone, and allow the user device to connect with a location device by a wireless connection or by scanning a barcode into the location device.

As used herein, a "smart contract" is a type of account that is stored on the blockchain; it is a collection of code, i.e. functions, and data, i.e. state, that resides at a specific address on the blockchain. A smart contract is not associated with an external node, but rather is a notional object existent only within the blockchain execution environment. A smart contract has direct control over its own state and storage memory to preserve persistent state variables. When referenced by a message or transaction, the smart contract executes its associated functions.

Smart contracts have a number of desirable properties. Execution of the smart contract is managed automatically by the network. Documents are encrypted on a shared ledger that is duplicated many times over on different nodes of the network, ensuring that the data is true and correct. Because smart contracts on distributed ledgers cannot be modified, they provide an immutable record of submitted workflow transactions that is highly resistant to post-transaction changes. Smart contracts automate progression tasks that were previously performed manually, thereby saving time, possibly many hours.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

FIG. 1 is a block diagram of a distributed ledger in a form of a blockchain depicted in accordance with an illustrative embodiment. Blockchain 100 is a blockchain, which is a specific implementation of a distributed ledger. Blockchain 100 is described to introduce blockchain concepts.

Blockchain 100 starts with genesis block 102. Blocks indicated with a right-leaning hash, such as block 104 or block 106, are part of the main chain. Blocks with a left-leaning hash, such as block 108 or block 110, exist outside of blockchain 100.

Thus, blockchain 100 is a heaviest path from root block 102 to leaf block 106 through the entire block tree. The "heaviest" path through the block tree, i.e. the path that has had the most computation done upon it, is conceptually identified as blockchain 100. Identifying blockchain 100 in this manner allows a decentralized consensus to be achieved for the state of blockchain 100.

Stated more formally, a blockchain is a distributed database that maintains a continuously growing list of ordered records called blocks. Each block contains a timestamp and a link to a previous block, with the hash of the prior block linking the two. By design, blockchains are inherently resistant to modification of the data because, once recorded, the data in a block cannot be altered retroactively. Through the use of a peer-to-peer network and one or more distributed timestamping servers, a blockchain database may be managed autonomously. Thus, blockchains may be used to provide an open, distributed ledger that can record transactions between parties efficiently and in a verifiable and permanent way.

Distributed ledgers, and blockchains in particular, are secure by design. Blockchains have a high byzantine fault tolerance. Thus, a decentralized consensus can be achieved with a blockchain. The first blockchain was created by Satoshi Nakamoto in 2008 and implemented the following year as a core component of the digital currency BITCOIN®, where it serves as the public ledger for all transactions. BITCOIN® was the first digital currency to solve the double spending problem, without the use of a trusted authority or central server.

Figure 2:
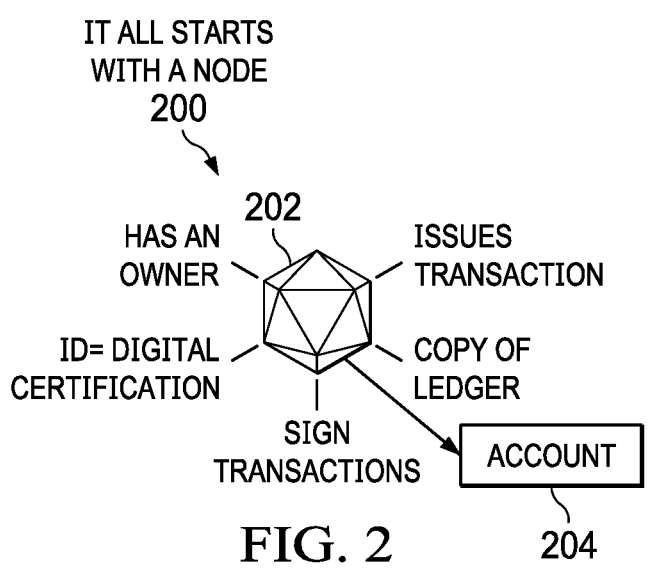
FIG. 2 is a block diagram illustrating a first step in creating a blockchain in accordance with an illustrative embodiment.
Figure 3:
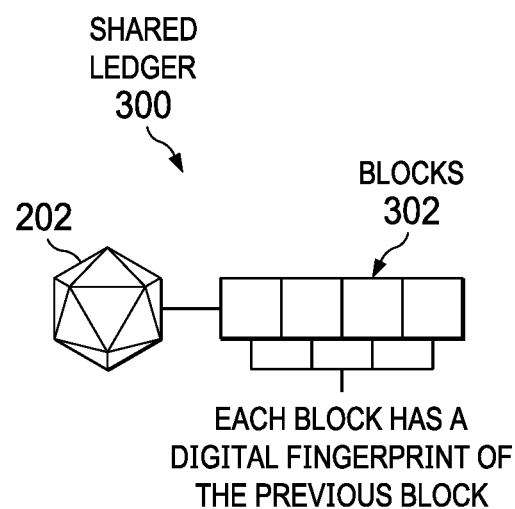
FIG. 3 is a block diagram illustrating a second step in creating a blockchain in accordance with an illustrative embodiment.
Figure 4:
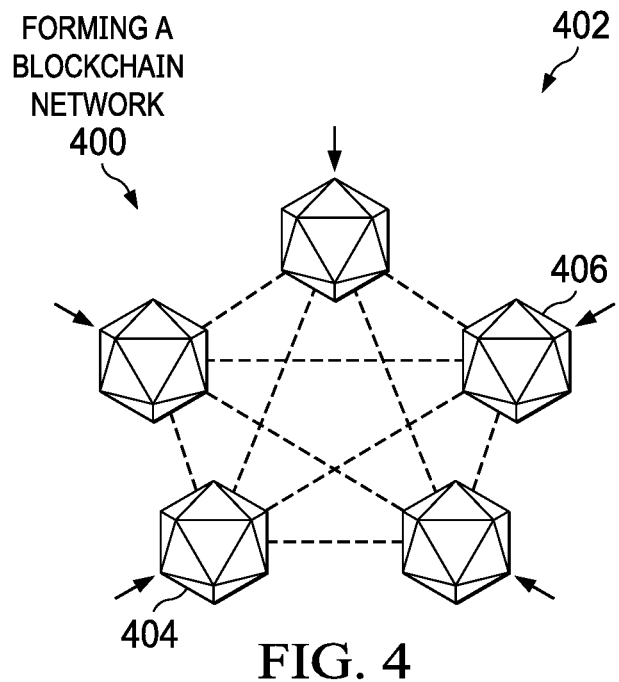
FIG. 4 is a block diagram illustrating a third step in creating a blockchain in accordance with an illustrative embodiment.
Figure 5:
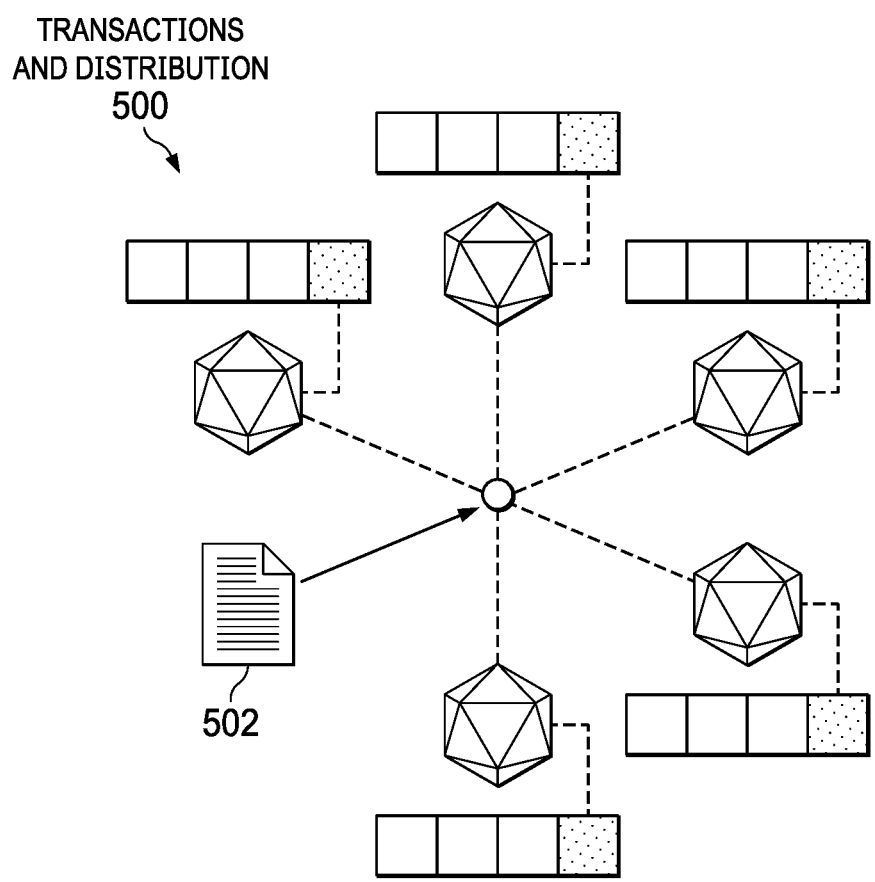
FIG. 5 is a block diagram illustrating a fourth step in creating a blockchain in accordance with an illustrative embodiment.
Figure 6:
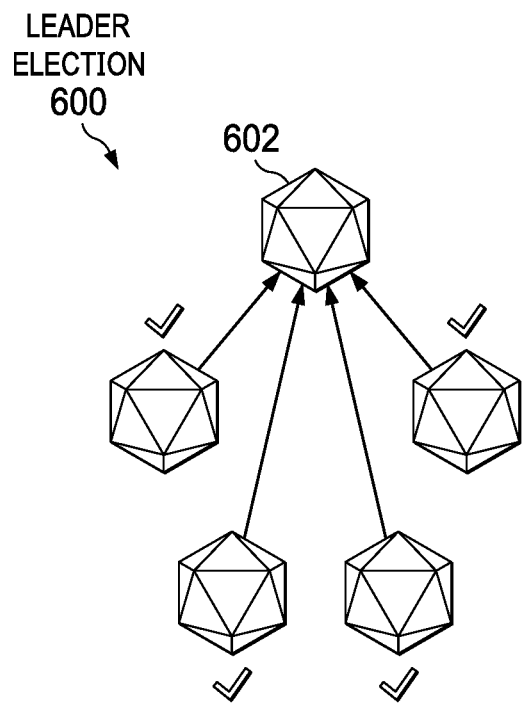
FIG. 6 is a block diagram illustrating a fifth step in creating a blockchain in accordance with an illustrative embodiment.
Figure 7:
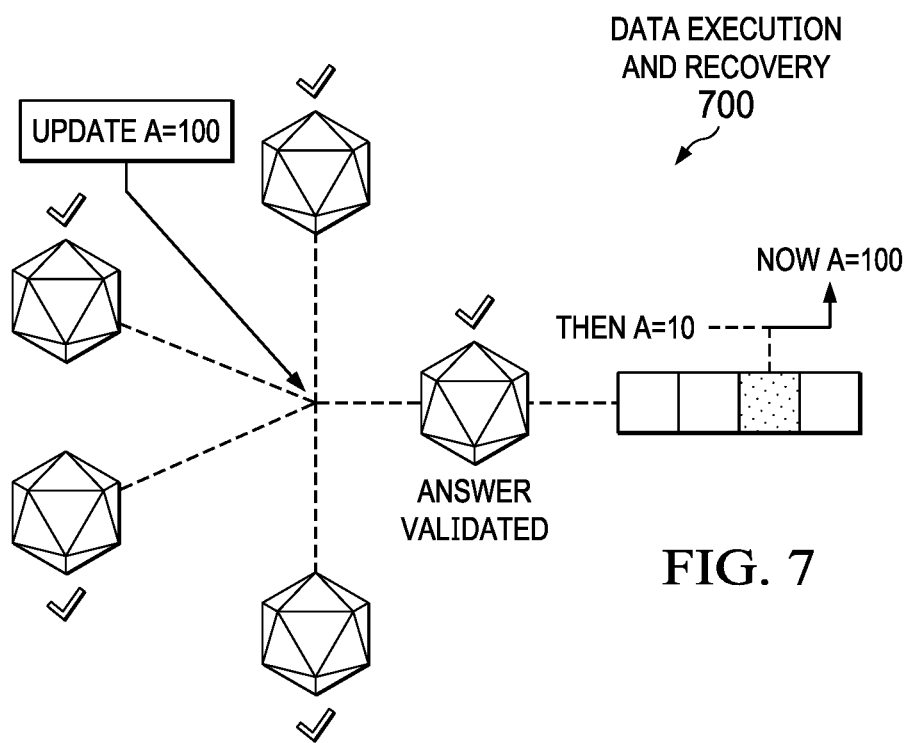
FIG. 7 is a block diagram illustrating a sixth step in creating a blockchain in accordance with an illustrative embodiment.

FIG. 2 through FIG. 7 should be considered together. FIG. 2 is a block diagram illustrating a first step in creating a blockchain in accordance with an illustrative embodiment. FIG. 3 is a block diagram illustrating a second step in creating a blockchain in accordance with an illustrative embodiment. FIG. 4 is a block diagram illustrating a third step in creating a blockchain in accordance with an illustrative embodiment. FIG. 5 is a block diagram illustrating a fourth step in creating a blockchain in accordance with an illustrative embodiment. FIG. 6 is a block diagram illustrating a fifth step in creating a blockchain in accordance with an illustrative embodiment. FIG. 7 is a block diagram illustrating a sixth step in creating a blockchain in accordance with an illustrative embodiment. FIG. 2 through FIG. 7 may be implemented on a computer or on multiple computers in a network environment. FIG. 2 through FIG. 7 address a technical problem that only exists in computer programming and execution. As used throughout FIG. 2 through FIG. 7, common reference numerals refer to common objects in these figures.

In operation 200 shown in FIG. 2, node 202 creates account 204 that contains the initial data for the distributed ledger 100 in FIG. 1. Account 204 is a state object recorded in the shared ledger that represents the identity of agents that can interact with the ledger. Account 204 includes an owner, a digital certificate identification, and a copy of a ledger. Node 202 may issue transactions from account 204 for interacting with the blockchain. Node 202 may sign transactions and inspect the blockchain and its associated state. The state of a blockchain is the combined state of all nodes that have interacted with the blockchain. Node 202 may issue transactions from account 204 for interacting with the blockchain.

In operation 300 shown in FIG. 3, node 202 collates transactions and distributions into blocks 302, and adds blocks 302 to the shared ledger. Blocks 302 function as a journal, recording a series of transactions together with the previous block and an identifier for the final state of the blockchain. Blocks 302 are chained together using a cryptographic hash as a means of reference—each block in the shared ledger has a digital fingerprint of the previous block. In this manner, it is not possible to alter previous blocks without being detected.

In operation 400 shown in FIG. 4, blockchain network 402 is formed. Blockchain network 402 may include multiple blockchains such as those shown in FIG. 2 or FIG. 3. Each node, such as node 404 or node 406, has its own blockchain.

In operation 500 shown in FIG. 5, transaction 502 is issued from an account, such as account 204 in FIG. 2. Transaction 502 is an instruction constructed by a node, such as node 202 in FIG. 2, and cryptographically-signed by an account, such as account 204.

There are two types of transactions: transactions that result in message calls, and transactions that result in the creation of new agent accounts, i.e., "contract creation" transactions. Transactions are that result in message calls containing data specifying input data for the message.

Transactions and distributions are collated into blocks that are added to the blockchain by the various nodes. The blockchain is synchronized across the various nodes. Thus, each node in blockchain network 402 adds identical blocks to a local copy of the blockchain.

In operation 600 shown in FIG. 6, leader election takes place. In this operation, leader node 602 is elected. Leader node 602 takes priority for deciding which information is the most accurate or up-to-date. Identifying information by leader node 602, and validating this information by other nodes, allows a decentralized consensus to be achieved throughout the network for the state of blockchain 100 in FIG. 1.

In operation 700 shown in FIG. 7, data execution and recovery takes place. A query regarding data stored in one or more of the nodes may return a validated answer regarding contents in the blocks.

Figure 8:
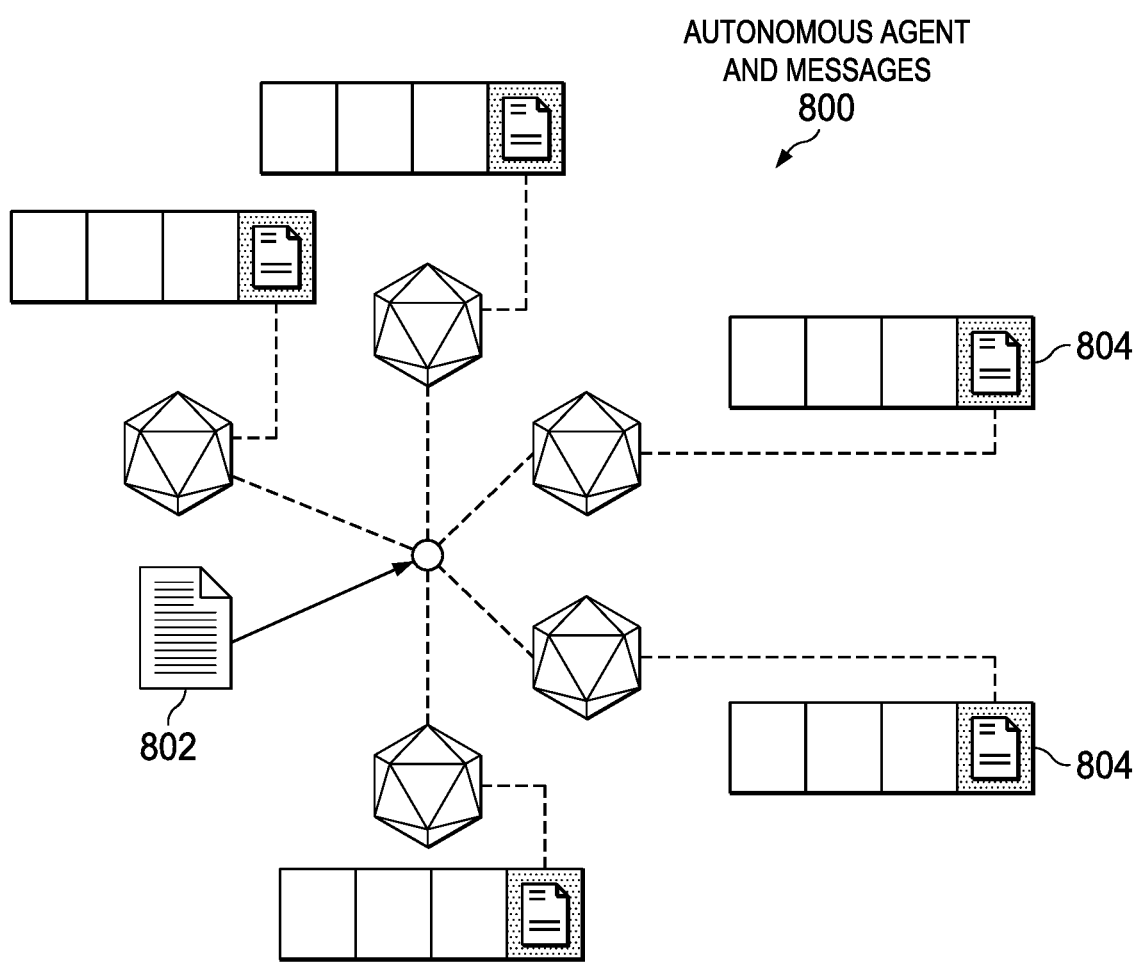
FIG. 8 is a block diagram illustrating a creation of a smart contract in accordance with an illustrative embodiment.
Figure 9:
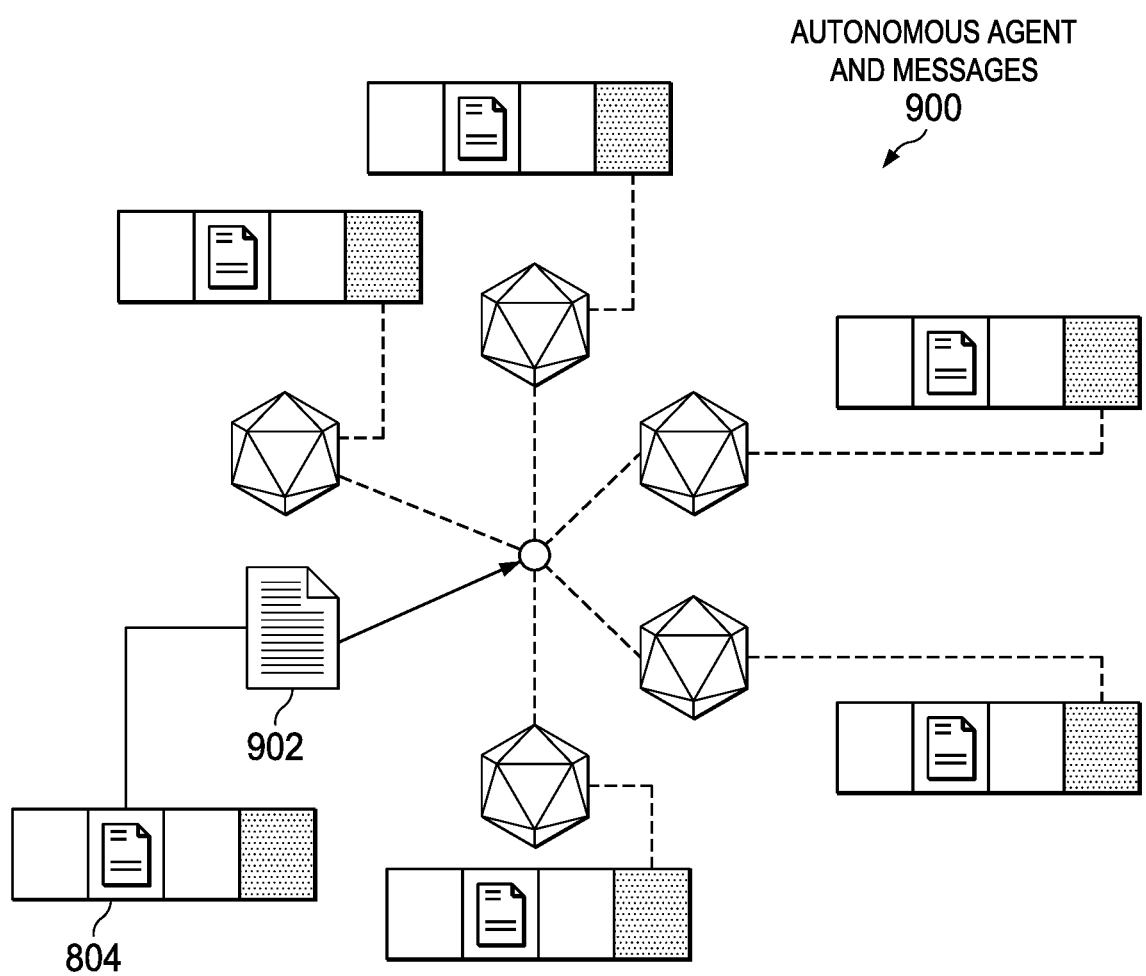
FIG. 9 is a block diagram illustrating an operation of a smart contract in accordance with an illustrative embodiment.

FIG. 8 and FIG. 9 should be considered together. FIG. 8 is a block diagram illustrating a step in creating a blockchain having a smart contract therein in accordance with an illustrative embodiment. FIG. 9 is a block diagram illustrating a step in creating a blockchain using a smart contract within a blockchain in accordance with an illustrative embodiment. FIG. 8 and FIG. 9 may be implemented on a computer or on multiple computers in a network environment.

In operation 800 shown in FIG. 8, transaction 802 and distributions are added to the various nodes. Thus, blocks are added to each node. As indicated above, there are two types of transactions: transactions that result in message calls, and transactions that result in the creation of new agent accounts.

Transaction 802 is a cryptographically-signed instruction constructed by a node, such as node 202 in FIG. 2. Transaction 802 results in the creation of smart contract 804. In contrast to data contained in message call transactions, such as transaction 502 in FIG. 5, transaction 802 contains data specifying initialization code for smart contract 804. Each node in a blockchain network executes this initialization code to incorporate smart contract 804 into the blockchain. In this illustrative example, the initialization code is executed at account creation and discarded immediately thereafter. The initialization code retrieves a second code fragment that executes each time the account receives a message call (either through a transaction or due to the internal execution of code).

Smart contract 804 is a type of account that is stored on the blockchain; it is a collection of code, i.e. functions, and data, i.e. state, that resides at a specific address on the blockchain. Smart contract 804 is not associated with an external node, but rather is a notional object existent only within the blockchain execution environment. Smart contract 804 has direct control over its own state and storage memory to preserve persistent state variables. When referenced by a message or transaction, smart contract 804 executes its associated functions.

In operation 900 shown in FIG. 9, smart contract 804 generates message 902. In a contract account, every time the contract account receives a message, its code activates. Message 902 is an instruction constructed by smart contract 804 in response to receiving a message. Message 902 is a sort of "virtual transaction" sent by code from one account to another. Message 902 can specify input data that results in message calls for other accounts, allowing smart contract 804 to read and write to internal storage. Alternatively, message 902 can contain data specifying initialization code, allowing smart contract 804 to create additional smart contracts.

In this illustrative example, code for smart contract 804 can be executed as part of state transition and block validation. If a transaction is added into a block, the code execution spawned by that transaction will be executed by all nodes that download and validate the block.

Figure 10:
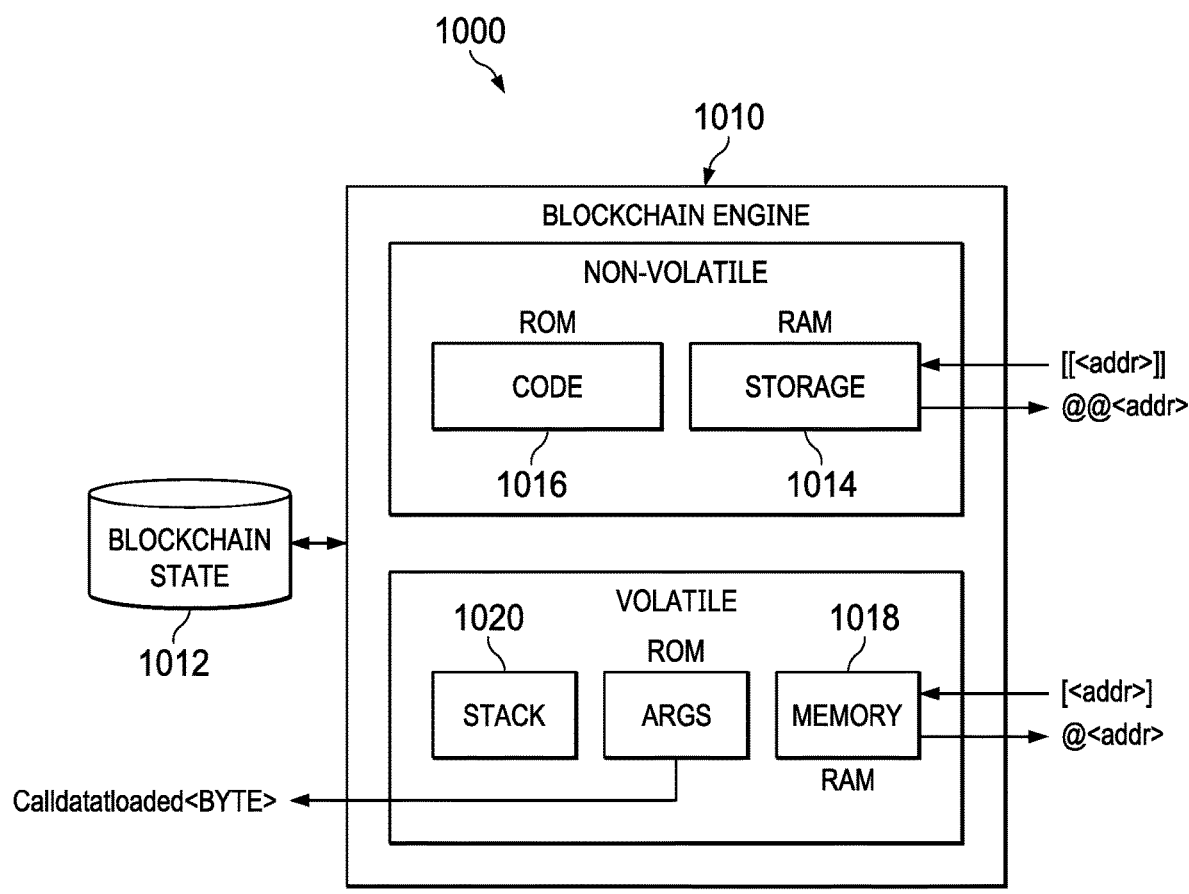
FIG. 10 is an illustration of an execution environment for executing a smart contract stored on a blockchain in accordance with an illustrative embodiment.

With reference next to FIG. 10, an illustration of an execution environment for executing a smart contract stored on a blockchain is depicted in accordance with an illustrative embodiment.

Blockchain environment 1000 includes a number of different components. As depicted, blockchain environment 1000 includes blockchain engine 1010 and blockchain state 1012.

Blockchain engine 1010 is responsible for internal account state and transaction computation for the blockchain. Blockchain engine 1010 performs state transitions for smart contracts. In this illustrative example, blockchain engine 1010 has a stack-based architecture that uses a last-in, first-out stack. Blockchain engine 1010 executes transactions recursively, computing the system state and the engine state for each loop. Blockchain engine 1010 includes non-volatile and volatile components. In an embodiment, blockchain engine 1010 can be a virtual machine.

Storage 1014 is non-volatile and is maintained on the blockchain as part of the system state. Every smart contract on the blockchain has its own storage. Storage 1014 preserves all the state variables for the smart contract that do not change between the function calls.

Code 1016 are instructions that formally specify the meaning and ramifications of a transaction or message to an account. Blockchain engine 1010 executes code 1016 in response to receiving a message call. In contrast to standard architecture where program code is stored in generally-accessible memory, code 1016 is stored separately in a virtual ROM that cannot be changed after construction.

Memory 1018 is volatile and is cleared between external function calls. Memory 1018 stores temporary data; for instance, function arguments, local variables, and storing return values. Stack 1020 is used to hold temporary values when conducting calculations in blockchain engine 1010.

Blockchain environment 1000 includes blockchain state 1012. Blockchain engine 1010 relies on blockchain state 1012 for execution of certain instructions. Blockchain state 1012 can include a mapping between blockchain addresses, i.e., accounts and account states. Blockchain state 1012 may not be stored on the blockchain, but rather in a data structure on a backend state database that maintains the mapping.

Figure 11A:
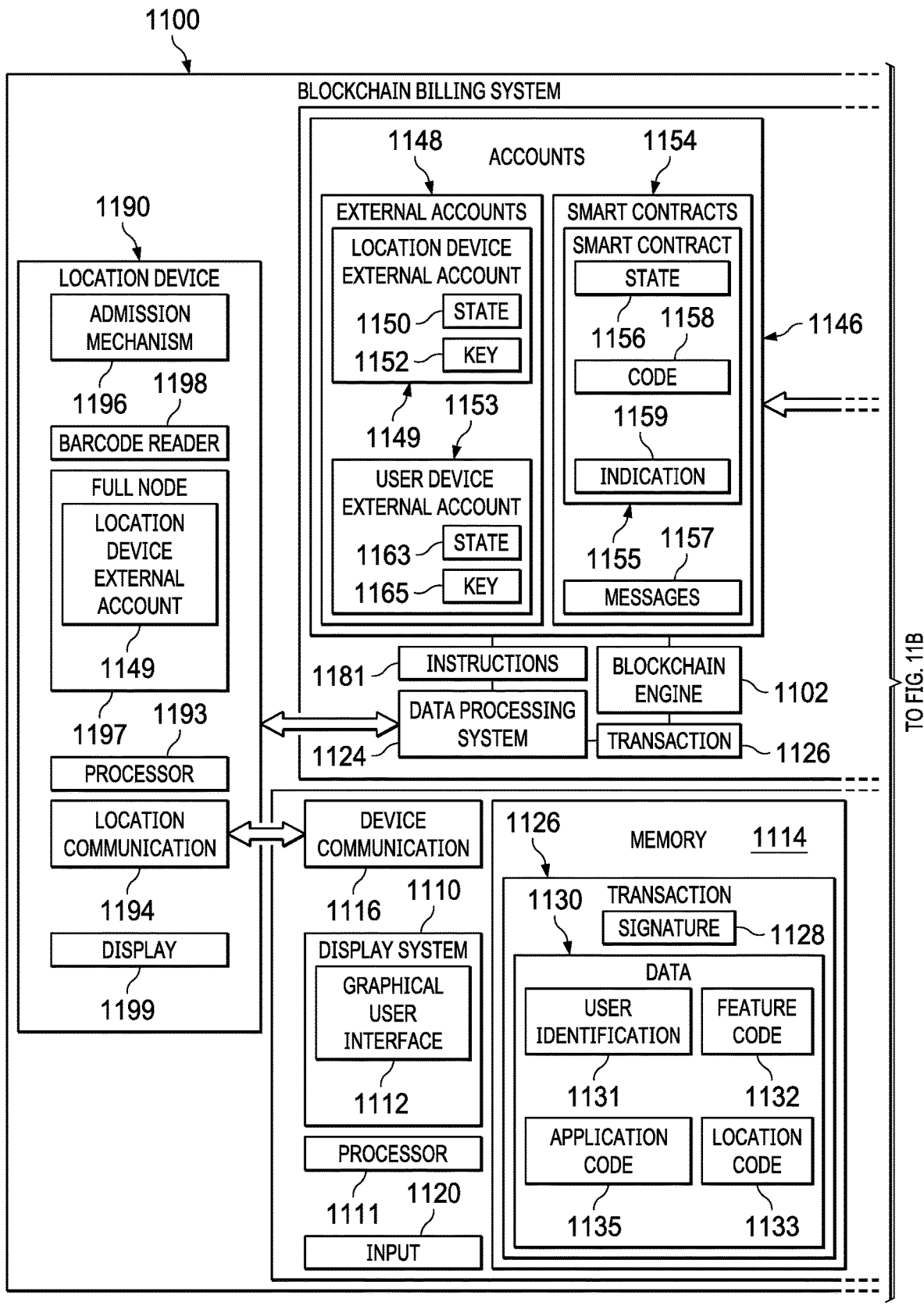
FIG. 11A and FIG. 11B are a block diagram of a blockchain billing system in accordance with an illustrative embodiment.
Figure 11B:
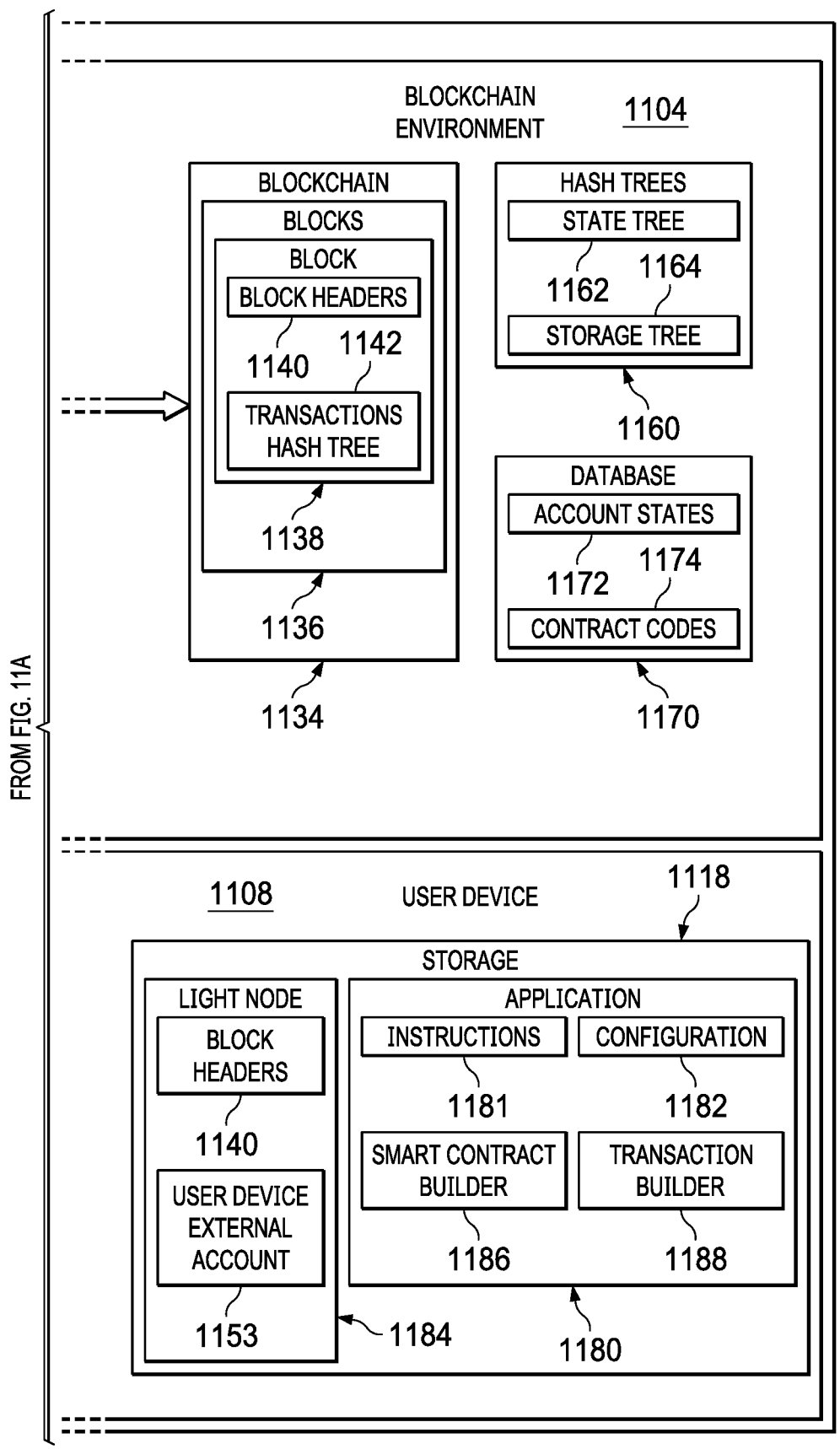

With reference now to FIG. 11A and FIG. 11B, a block diagram of a blockchain billing system is depicted in accordance with an illustrative embodiment. Blockchain billing system 1100 may be configured to take different forms. For example, blockchain billing system 1100 may be selected from at least one of a ticketing system, an amusement ride system, a system for online purchases, a system to pay for service consumption, or some other type of sale or service system that records and stores billing events and information.

Blockchain billing system 1100 may be implemented in software, hardware, firmware, or a combination thereof. When software is used, the operations performed by blockchain billing system 1100 may be implemented in program code configured to run on hardware, such as a processor unit. When firmware is used, the operations performed by blockchain billing system 1100 may be implemented in program code and data and stored in persistent memory to run on a processor unit. When hardware is employed, the hardware may include circuits that operate to perform the operations in blockchain billing system 1100.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As depicted, blockchain billing system 1100 includes blockchain environment 1104, location device 1190, and user device 1108. In this illustrative embodiment, blockchain billing system 1100 can be implemented in blockchain environment 1104. Blockchain environment 1104 can be a physical hardware system and includes one or more data processing systems such as data processing system 1124. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

Data processing system 1124 in blockchain environment 1104 manages accounts 1146, blockchain 1134, hash trees 1160, database 1170, and blockchain engine 1102. Data processing system 1124 receives instructions 1181 and transaction 1126 from location device 1190. Location device 1190 receives instructions 1181 and transaction 1126 from user device 1108 via device communication 1116 in user device 1108 and location communication 1194 in location device 1190. Hash trees 1160 can include state tree 1162 and storage tree 1164. Database 1170 can include account states 1172 and contract codes 1174.

User device 1108 comprises display system 1110, device communication 1116, storage 1118, input 1120, processor 1111, and memory 1114. Device communication 1116 connects user device 1108 to data processing system 1124 via location communication 1194 in location device 1190. Storage 1118 provides non-volatile storage for application 1180 and light node 1184. As used herein, a "light node" shall mean a node in a blockchain environment that retains only headers rather than complete blocks in order to reduce a size of the storage in a device, such as user device 1108. Application 1180 comprises configuration 1182, smart contract builder 1186, and transaction builder 1188. Application 1180 can run on processor 1111 using memory 1114 and receive inputs from input 1120. In one illustrative example, user device 1108 can be a mobile device.

In an illustrative embodiment, a user can desire an action to be taken by location device 1190. A user may select an action using input 1120 on display system 1110. In response to the selection received from input 1120, application 1180 runs transaction builder 1188 on processor 1111. Transaction builder 1188 forms transaction 1126 to send to data processing system 1124 in blockchain environment 1104. Transaction 1126 comprises signature 1128 and data 1130. Data 1130 comprises user identification 1131, feature code 1132, location code 1133, and application code 1135. Transaction builder 1188 can store transaction in memory 1114 to send to data processing system 1124 when smart contract 1155 has been created in response to instructions 1181.

Smart contract builder 1186 runs on processor 1111 to send instructions 1181 via device communication 1116 to location communication 1194 in location device 1190 and onto data processing system 1124 to create smart contract 1155 in smart contracts 1154. Smart contract builder 1186 reads the signature and data in memory 1114 and sends instructions 1181 to create smart contract 1155 so that smart contract 1155 will send one of messages 1157 in response to smart contract 1155 reading signature 1128 and data 1130 in transaction 1126. When smart contract 1155 is formed by data processing system 1124 in blockchain environment 1104, application 1180 sends transaction 1126 from memory 1114 to data processing system 1124. Transaction 1126 is sent by processor 1111 from memory 1114 via device communication 1116 to location communication 1194 and from location device 1190 by processor 1193 to data processing system 1124. In an embodiment, smart contract 1155, when formed by instructions 1181, can send indication 1159 to user device 1108 so that, upon receipt of notification 1159, transaction 1126 can be sent as described above to data processing system 1124.

When transaction 1126 is received in blockchain environment 1104, blockchain engine 1102 causes smart contract 1155 to read transaction 1126. When smart contract 1155 reads transaction 1126, smart contract 1155 sends one of messages 1157 to location device 1190 to cause location device 1190 to perform the action requested by a user of user device 1118. In an embodiment, the one of messages 1157 can be a first message. In the embodiment, when smart contract 1155 sends the first message from messages 1157 to location device 1190, smart contract 1155 also sends a second message from messages 1157 to user device external account 1153 to cause payment to be made for the action performed by location device 1190. Moreover, the payment and the action are recorded in block 1138 in blocks 1136 of blockchain 1134.

Location device 1190 receives one of messages 1157 from smart contract 1155 via location communication 1194 and causes an action to be performed. In an illustrative embodiment, an action to be performed can be admitting a user of user device 1108 to an event, to a ride in an amusement park, or to an item purchased by the user of user device 1108. In the illustrative embodiment, admission can be performed by admission mechanism 1196 which can be a gate, a door, a window, a signal to proceed, or some other type of admission mechanism known to persons skilled in the art. Location device 1190 can provide an indication of payment and admission on display 1199.

Location device 1190 can include full node 1197 in blockchain 1134 so that when a block in blockchain 1134 is updated with a record of payment and admission, full node 1197 is updated and verified as well. Location device 1190 can be associated with location device external account 1149 having state 1150 and key 1152. In an embodiment, location device 1190 can comprise barcode reader 1198.

Light node 1184 in storage 1118 of user device 1108 can store block headers 1140 that point to block headers 1140 in blocks 1136 in blockchain 1134. Block headers 1140 in light node 1184 and block headers 1140 in block 1138 are the same; moreover, any update to block headers 1140 in block 1138 will be updated in block headers 1140 in light node 1184 each time block chain 1134 is updated. Light node 1184 can be associated with user device external account 1153 having state 1163 and key 1165. In an embodiment, user device external account 1153 can provide signature 1128 to transaction 1126.

Transaction 1126 may be generated by user input to graphical user interface 1112 using one or more of input 1120 in user device 1108. User device 1108 may be a keyboard, a mouse, a graphical user interface (a physical display), a touch screen, a voice interaction, and any other suitable interface for interacting with the computer.

In one illustrative example, user device 1108 displays graphical user interface 1112 on display system 1110. In this illustrative example, display system 1110 can be a group of display devices. A display device in display system 1110 may be selected from one of a liquid crystal display (LCD), a light emitting diode (LED) display, an organic light emitting diode (OLED) display, and other suitable types of display devices.

Blockchain billing system 1100 receives transaction 1126. Transaction 1126 identifies signature 1128 and data 1130. In an illustrative embodiment, data 1130 includes user identification 1131, feature code 1132, location code 1133, and application code 1135. Signature 1128 and data 1130 of transaction 1126 may be associated with one of external accounts 1148. In an illustrative embodiment, user device external account 1153 can be associated with a user of user device 1108. External accounts 1148 can include an account such as one of accounts 204 shown in FIG. 2.

Transaction 1126 can be cryptographically-signed. For example, signature 1128 uniquely identifies a key of the particular account that issues transaction 1126. The key may be key 1165 in user device external account 1149 in external accounts 1148. For example, based on signature 1128 identifying user device external account 1153, blockchain billing system 1100 is able to uniquely identify that user device 1108 issued transaction 1126.

Blockchain billing system 1100 records transaction 1126 in blockchain 1134. Transaction 1126 is submitted to and recorded in blockchain billing system 1100. Blockchain billing system 1100 records transaction 1126 in blocks 1136 of blockchain 1134.

Each of transactions 1126 is hashed and stored in transactions hash tree 1142 of block 1138. All of the transaction hashes in transactions hash tree 1142 are themselves hashed and stored as a root hash as part of block headers 1140.

Blockchain billing system 1100 determines whether one of smart contracts 1152, recorded within blockchain environment 1104, permits transaction 1126. In an embodiment, smart contract 1155 can determine whether transaction 1126 is permitted by executing code 1158, which can be code 1016 of FIG. 10.

Responsive to determining that smart contract 1155 issued one of messages 1157 in response to transaction 1126, blockchain billing system 1100 updates state 1163 of user device external account 1153 to reflect transaction 1126. External accounts 1148, including user device external account 1153, and location device external account 1149 are state objects recorded in blockchain 1134. Blockchain billing system 1100 can set state 1163 of user device external account 1153 in response to determining that smart contract 1155 issued a message from messages 1157 in response to transaction 1126. For example, upon determining that smart contract 1155 issued a message from messages 1157 in response to transaction 1126, blockchain billing system 1100 may set state 1156 to indicate a billing state for user device 1108.

In this illustrative example, smart contracts 1154 can generate one or more additional ones of transactions 1126 in response to the execution of code 1158. These additional ones of transactions 1126 can be transactions that are sent to other ones of accounts 1146 in blockchain billing system 1100. For example, smart contracts 1154 may generate transaction 1126 addressed to one or more of external accounts 1148. In this illustrative example, data 1130 of transaction 1126 generated by smart contract 1155 can include billing information relevant to transaction 1126.

The illustrative example in FIG. 11A and FIG. 11B and the examples in the other subsequent figures provide one or more technical solutions that address one or more technical problems that only exist in computers, particularly a network-centric system of computers. Specifically, blockchain billing system 1100 provides an immutable record of transaction 1126. In this manner, the use of blockchain billing system 1100 has a technical effect of reporting transaction 1126 using blockchain 1134, thereby reducing time, effort, or both in the accurate and extensive record-keeping necessary to effectively maintain records of software use. In this manner, maintaining accurate records of transaction 1126 may be performed more efficiently as compared to currently used systems that do not include blockchain billing system 1100.

As a result, data processing system 1124 operates as a special purpose computer system in which blockchain billing system 1100 uses data processing system 1124 to record transaction 1126. Blockchain billing system 1100 receives transaction 1126 that identifies an account of a user in blockchain billing system 1100. Blockchain billing system 1100 records transaction 1126 in a billing blockchain. Blockchain billing system 1100 may determine whether smart contract 1155 recorded within the billing blockchain permits a software use event. The software use event can be transaction 1126. The smart contract can be smart contract 1155. Responsive to determining that smart contract 1155 permits the software use event, blockchain billing system 1100 updates a state of the account of the user in the blockchain billing system to reflect transaction 1126.

Responsive to determining that the user is permitted to perform transaction 1126, blockchain billing system 1100 records transaction 1126.

Figure 12:
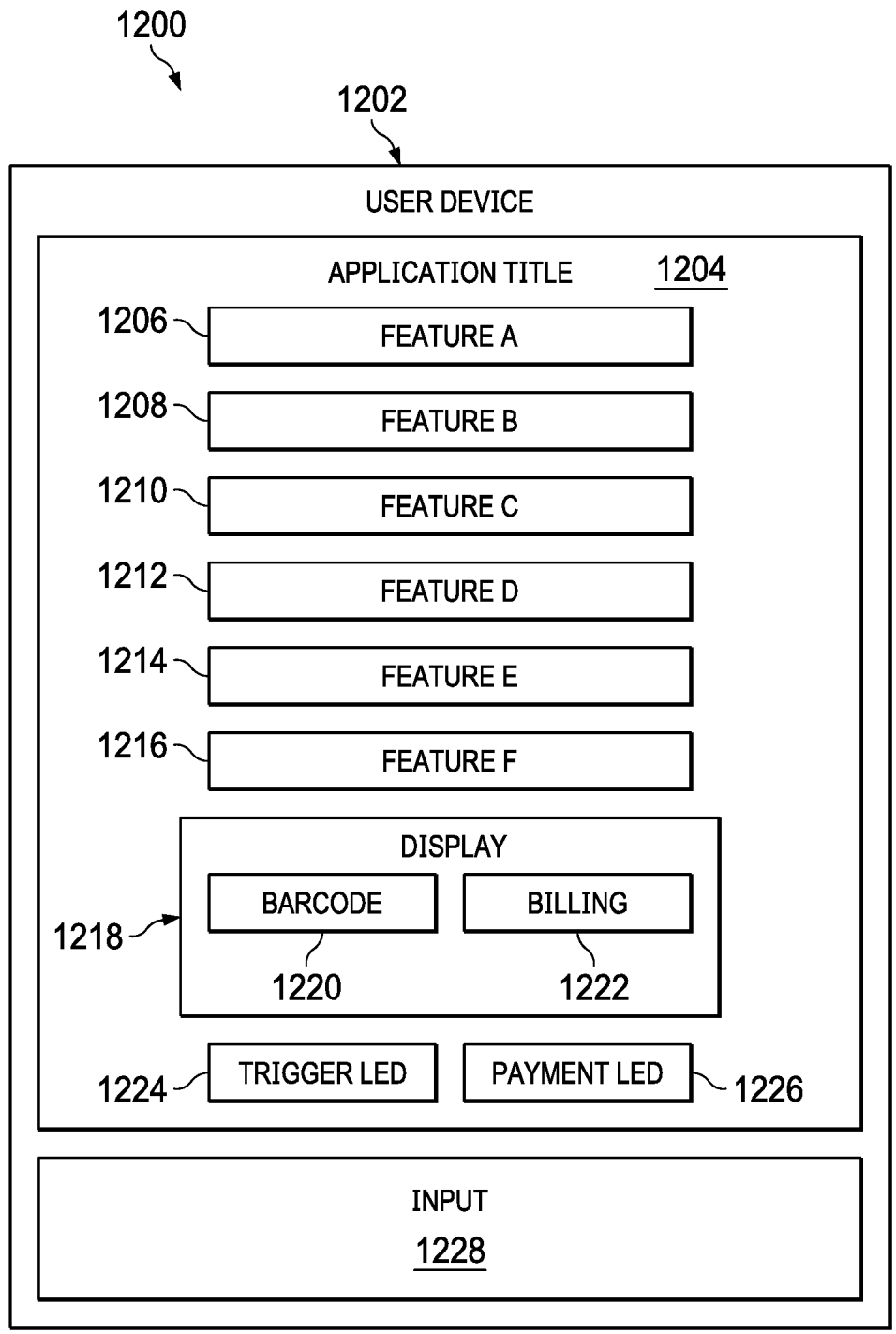
FIG. 12 is a depiction of a front side of a user device for use in a blockchain billing system in accordance with an illustrative embodiment.

With reference next to FIG. 12, front side of a user device for use in a blockchain billing system is depicted in accordance with an illustrative embodiment. Front side 1200 can be a front side of user device 1202. User device 1202 can be user device 1108 in FIG. 11A and FIG. 11B. User device 1202 comprises input 1228 and application title 1204. Input 1228 can be input 1120 in FIG. 11A. Application title 1204 can be a designation of a particular application. A number of feature selection mechanisms can be provided such as feature A 1206, feature B 1208, feature C 1210, feature D 1212, feature E 1214, and feature F 1216. Display 1218 can display barcode 1220 and billing 1222. A number of LED lights may be provided such as trigger LED 1224 and payment LED 1226. Trigger LED 1224 can provide an indication to a user that admission mechanism 1196 in location device 1190 in FIG. 11A has been activated. Payment LED 1226 can provide an indication to a user of user device 1202 that payment for an action selected from the number of selections has been made.

In an alternate illustrative embodiment, barcode 1220 can be used to display a barcode that can be read by barcode reader 1198 in location device 1190 in FIG. 11A. Barcode 1220 can be used when user device 1108 is not connected to data processing system 1124 in FIG. 11A. In the event user device 1202 is not connected to data processing system 1124, transaction 1126 in FIG. 11A is sent to data processing system 1124 via barcode reader 1198 and location communication 1194 in FIG. 11A.

Figure 13:
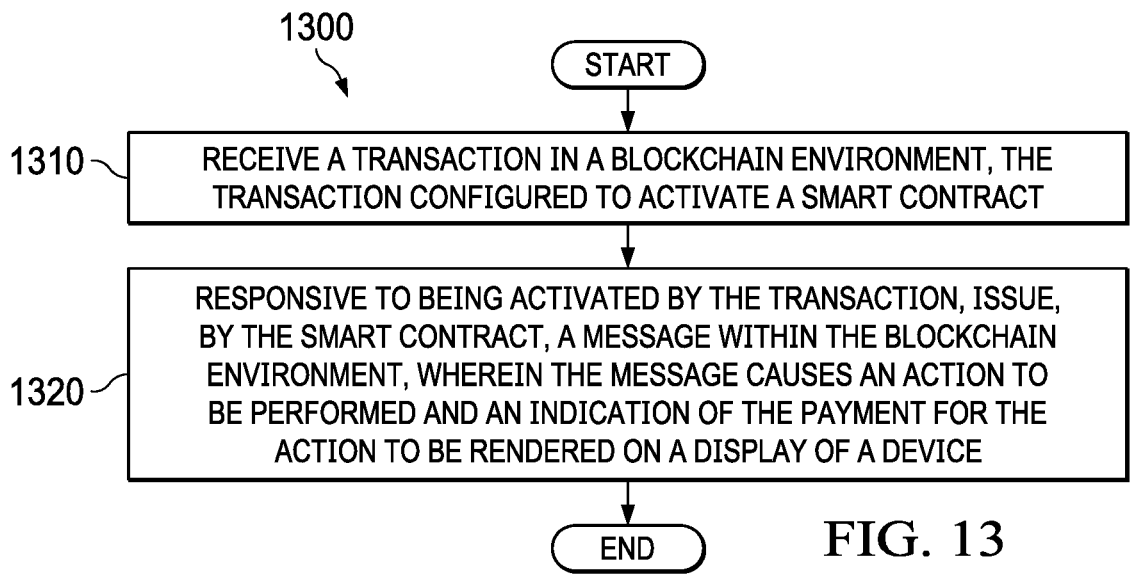
FIG. 13 is a flowchart of a process for using a smart contract to cause an action to be performed and paymemt for the action to be rendered in accordance with an illustrative embodiment.

With reference next to FIG. 13, a flowchart of a process for using a smart contract to cause an action to be performed and payment for the action to be rendered is depicted in accordance with an illustrative embodiment. The process of FIG. 13 can be a software process implemented in one or more components of blockchain engine 1010 in FIG. 10 or blockchain engine 1102 in FIG. 11A and blockchain billing system 1100 of FIG. 11A and FIG. 11B.

Process 1300 starts. A transaction is received in a blockchain environment (step 1310). The transaction can be transaction 1126 in FIG. 11A. The blockchain environment can be blockchain environment 1104 in FIG. 11A and FIG. 11B. The transaction is configured to activate a smart contract. The transaction can be configured by transaction builder 1188 in application 1180 in FIG. 11B. Responsive to being activated by the transaction, the smart contract issues a message within the blockchain environment, wherein the message causes the action to be performed and an indication of the payment for the action to be rendered on a display of a device (step 1320). The smart contract can be smart contract 1155 in smart contracts 1154 in accounts 1146 of blockchain environment 1104 in FIG. 11A and FIG. 11B. The message can be one of messages 1157 in FIG. 11A. The action can be an action performed by processor 1193 in location device 1190 such as activation of admission mechanism 1196 in FIG. 11A. The indication of the payment can be payment LED 1226 of user device 1202 in FIG. 12. In addition, when the admission mechanism is activated, the activation can be indicated on trigger LED 1224 of user device 1202 in FIG. 12. User device 1202 can be user device 1108 in FIG. 11A and FIG. 11B. Process 1300 ends.

Figure 14:
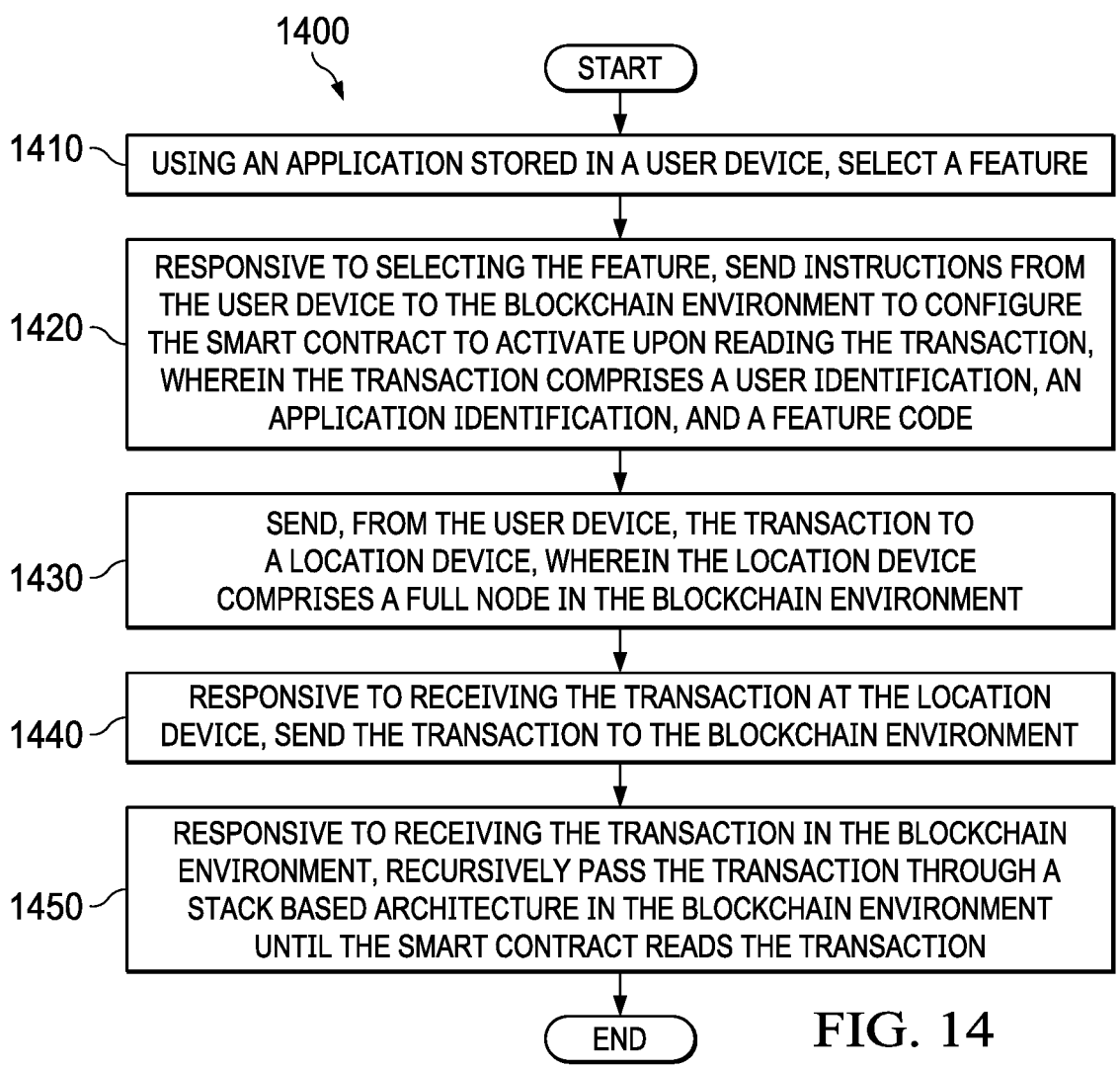
FIG. 14 is a flowchart of a process for configuring a smart contract in a blockchain billing system in accordance with an illustrative embodiment.

With reference next to FIG. 14, a flowchart of a process for configuring a smart contract in a blockchain billing system is depicted in accordance with an illustrative embodiment. The process of FIG. 14 can be a software process implemented in one or more components of blockchain engine 1010 in FIG. 10 and blockchain billing system 1100 of FIG. 11A and FIG. 11B.

Process 1400 starts. An application stored in the device is used to select a feature (step 1410). The application can be application 1180 in user device 1108 in FIG. 11A and FIG. 11B. Selection of the feature can be made by activating one of a number of selection mechanisms on user device 1202 in FIG. 12, such as one of feature A 1206, feature B 1208, feature C 1210, feature D 1212, feature E 1214, and feature F 1216. Responsive to selecting the feature, instructions are sent to the blockchain environment to configure the smart contract to activate upon reading the transaction, wherein the transaction comprises a user identification, an application identification, and a feature code (step 1420). The instructions can be instructions 1181 in FIG. 11B. The blockchain environment can be blockchain environment 1104 in FIG. 11A and FIG. 11B. The smart contract can be smart contract 1155 in FIG. 11A. The transaction can be transaction 1126 comprising signature 1128, location code 1133, user identification 1131, application code 1135, and feature code 1132 in FIG. 11A. The transaction is sent from the device to a location device, wherein the location device comprises a full node in the blockchain environment (step 1430). The device can be user device 1108 in FIG. 11A and FIG. 11B. The location device can be location device 1190 in FIG. 11A. The full node in the blockchain can be full node 1197. Responsive to receiving the transaction at the location device, the transaction is sent to the blockchain environment (step 1440). Responsive to receiving the transaction in the blockchain environment, the transaction is recursively passed through a stack-based architecture in the blockchain environment until the smart contract reads the transaction (step 1450). The transaction can be recursively passed through a stack-based architecture in the blockchain environment by blockchain engine 1102 in FIG. 11A. The stack-based architecture can include smart contracts 1154 in accounts 1146 in FIG. 11A. Process 1400 ends.

Figure 15:
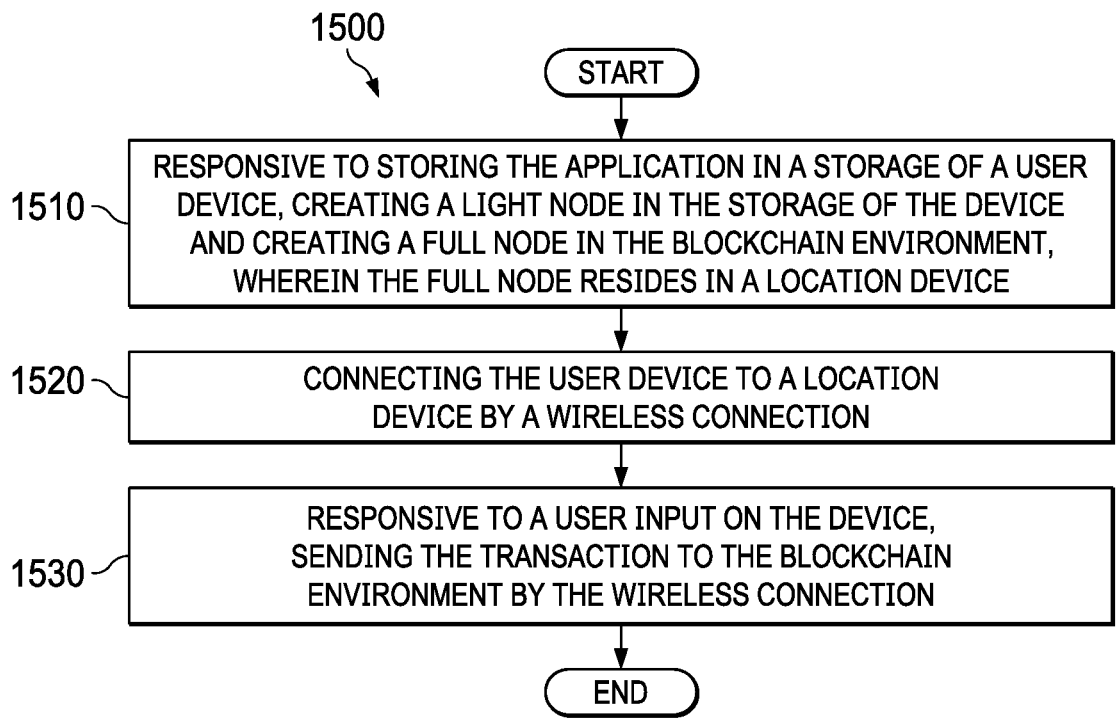
FIG. 15 is a flowchart of a process for creating a light node in a blockchain billing system in accordance with an illustrative embodiment.

With reference next to FIG. 15, a flowchart of a process for creating a light node in a blockchain billing system is depicted in accordance with an illustrative embodiment. The process of FIG. 15 can be a software process implemented in one or more components of blockchain engine 1010 in FIG. 10 and blockchain billing system 1100 of FIG. 11A and FIG. 11B.

Process 1500 starts. Responsive to storing an application in a storage of the device, a light node is created in the storage of the device and a full node is created in the blockchain environment (step 1510). The storage can be storage 1118 in FIG. 11B. The application can be application 1180 in FIG. 11B. The light node can be light node 1184 in FIG. 11B. The full node can be full node 1197 in FIG. 11A. The blockchain environment can be blockchain environment 1104 in FIG. 11A and FIG. 11B. The device is connected to a location device by a wireless connection (step 1520). The device can be user device 1108 in FIG. 11A and FIG. 11B. The location device can be location device 1190 in FIG. 11A. The connection can be by device communication 1116 and location communication 1194 in FIG. 11A. Device communication 1116 and location communication 1194 can be configured for wireless communication. Responsive to a user input on the device, the transaction is sent to the blockchain environment by the wireless connection (step 1530). The user input can be made by using input 1120 in user device 1108 in FIG. 11A and FIG. 11B. In an embodiment, the user input can be made by using input 1228 in user device 1202 in FIG. 12. Process 1500 ends.

Figure 16:
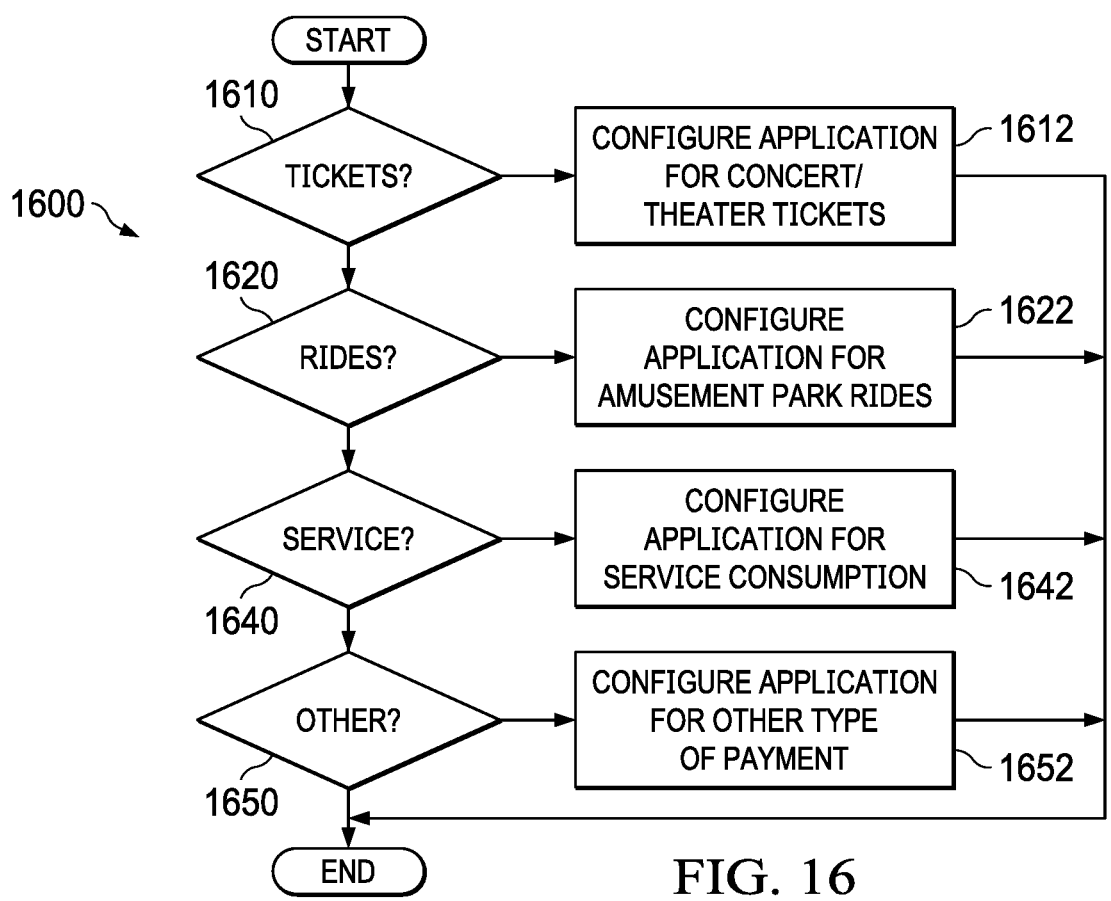
FIG. 16 is a flowchart of a process for configuring a software application for a number of types of actions and payments in a blockchain billing environment in accordance with an illustrative embodiment.

With reference next to FIG. 16, a flowchart of a process for configuring a software application for a number of types of actions and payments in a blockchain billing environment is depicted in accordance with an illustrative embodiment. The process of FIG. 16 can be a software process implemented in one or more components of blockchain engine 1010 in FIG. 10 and blockchain billing system 1100 of FIG. 11A and FIG. 11B.

Process 1600 starts. A determination is made whether the software application is to be configured for ticket sales (step 1610). As used herein, concert/theater tickets may be for concert tickets, sporting events, theater tickets, or for any type of event for which tickets are sold. If the software application is to be configured for ticket sales, then the software application is configured for sale of concert/theater tickets (step 1612). If tickets are not selected, then a determination is made as to whether the software application will be configured for rides (step 1620). If the software application is to be configured for rides, then the software application is configured for amusement park rides (step 1622). As used herein, amusement park rides may be for any type of ride for which tickets are sold. Next, a determination is made as to whether the software application is to be configured for service consumption (step 1640). If the software application is to be configured for service consumption, then the software application is configured for service consumption (step 1642). As used herein, service consumption may be any type of service for which payment is required such as transportation, professional services, and other types of services. Afterwards, a determination is made as to whether the software application is to be configured for any other type of payment, such as a specialized payment not included above. If so, the software application is configured for the other type of payment (step 1652). Process 1600 ends.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
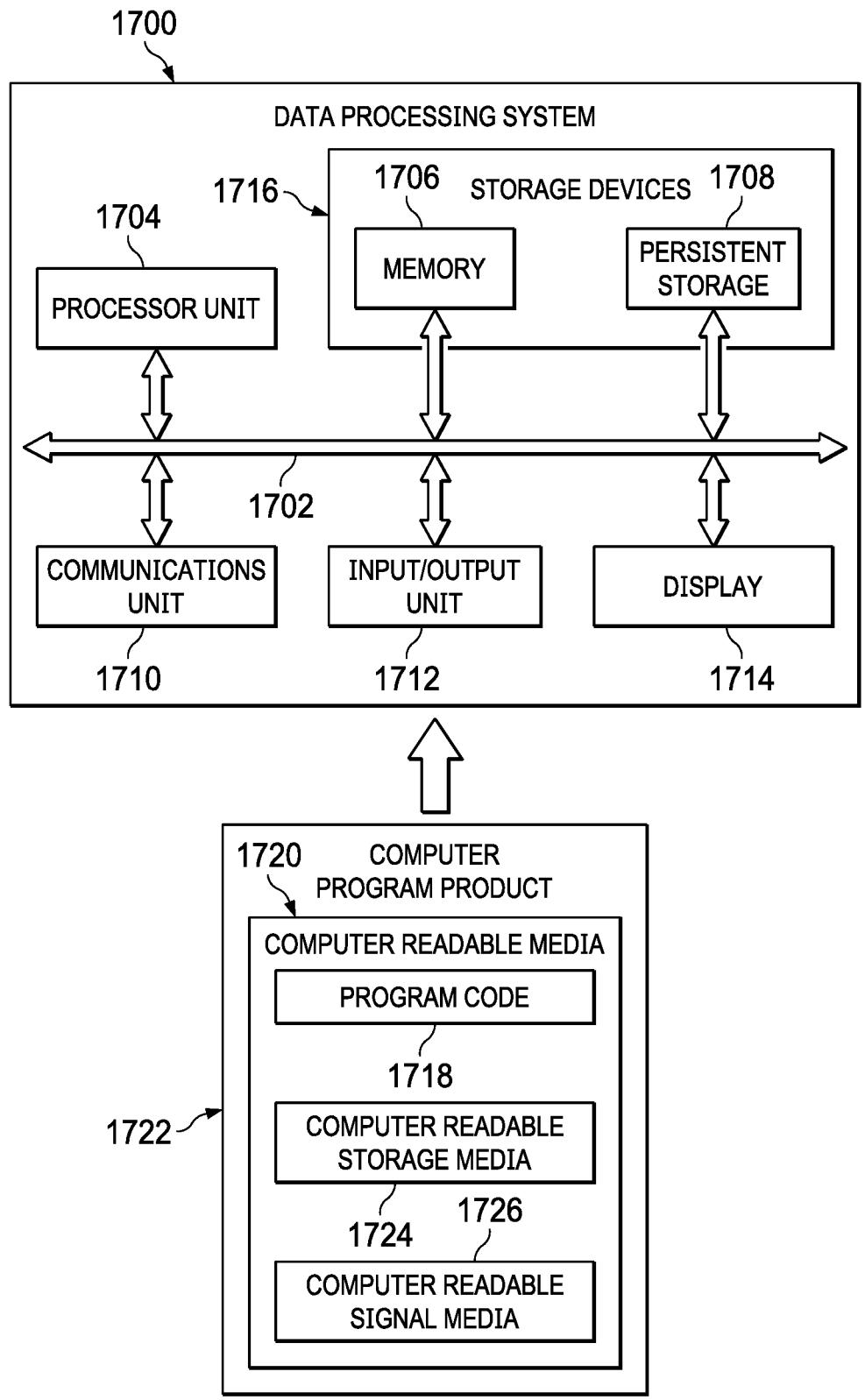
FIG. 17 is a block diagram of a data processing system in accordance with an illustrative embodiment.

Turning now to FIG. 17, an illustration of a block diagram of a data processing system is depicted in accordance with an illustrative embodiment. In this illustrative example, data processing system 1700 includes communications framework 1702, which provides communications between processor unit 1704, memory 1706, persistent storage 1708, communications unit 1710, input/output (I/O) unit 1728, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid state hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In one example, computer-readable media 1720 may be computer-readable storage media 1724 or computer-readable signal media 1726.

In these illustrative examples, computer-readable storage media 1724 is a physical or tangible storage device used to store program code 1718 rather than a medium that propagates or transmits program code 1718.

Alternatively, program code 1718 may be transferred to data processing system 1700 using computer-readable signal media 1726. Computer-readable signal media 1726 may be, for example, a propagated data signal containing program code 1718. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for automatically causing an action to be performed and a payment for the action to be made in a blockchain environment, the computer-implemented method comprising:

receiving a transaction in the blockchain environment, the transaction configured to activate a smart contract;

responsive to being activated by the transaction, issuing, by the smart contract, a message within the blockchain environment, wherein the message causes the action to be performed and an indication of the payment for the action to be rendered on a display of a user device;

using an application stored in the user device;

selecting a feature;

responsive to selecting the feature, sending instructions from the user device to the blockchain environment to configure the smart contract to activate upon reading the transaction, wherein the transaction comprises a user identification, an application identification, and a feature code;

sending, from the user device, the transaction to a location device, wherein the location device comprises a full node in the blockchain environment; and responsive to receiving the transaction at the location device, sending the transaction to the blockchain environment.

2. The computer-implemented method of claim 1, wherein the action comprises one or more of effecting an admission to a location, billing for the admission, making the payment for the admission, and recording the payment in a blockchain in the blockchain environment.

3. A computer-implemented method for automatically causing an action to be performed and a payment for the action to be made in a blockchain environment, the computer-implemented method comprising:

receiving a transaction in the blockchain environment, the transaction configured to activate a smart contract;

responsive to being activated by the transaction, issuing, by the smart contract, a message within the blockchain environment, wherein the message causes the action to be performed and an indication of the payment for the action to be rendered on a display of a user device;

using an application stored in the user device;

selecting a feature;

responsive to selecting the feature, sending instructions from the user device to the blockchain environment to configure the smart contract to activate upon reading the transaction, wherein the transaction comprises a user identification, an application identification, and a feature code;

connecting the user device to a location device by a wireless connection; and responsive to a user input on the user device, sending the transaction to the blockchain environment by the wireless connection.

4. A computer-implemented method for automatically causing an action to be performed and a payment for the action to be made in a blockchain environment, the computer-implemented method comprising:

receiving a transaction in the blockchain environment, the transaction configured to activate a smart contract;

responsive to being activated by the transaction, issuing, by the smart contract, a message within the blockchain environment, wherein the message causes the action to be performed and an indication of the payment for the action to be rendered on a display of a user device;

using an application stored in the user device;

selecting a feature; and responsive to selecting the feature, sending instructions from the user device to the blockchain environment to configure the smart contract to activate upon reading the transaction, wherein the transaction comprises a user identification, an application identification, and a feature code, wherein the user device is a light node in the blockchain environment, and wherein the light node contains only headers for pointing to data in a full node.

5. The computer-implemented method of claim 3, wherein sending the transaction to the location device comprises one of scanning a barcode into a barcode reader at the location device and sending the transaction in a wireless transmission to the location device.

6. The computer-implemented method of claim 3, further comprising:

responsive to storing the application in a storage of the device, creating a light node in the storage of the device and creating a full node in the blockchain environment.

7. The computer-implemented method of claim 1, wherein sending the transaction to the location device comprises one of scanning a barcode into a barcode reader at the location device and sending the transaction in a wireless transmission to the location device.

8. The computer-implemented method of claim 1, further comprising:
   responsive to storing the application in a storage of the device, creating a light node in the storage of the device and creating a full node in the blockchain environment.

9. The computer-implemented method of claim 3, wherein the action comprises one or more of effecting an admission to a location, billing for the admission, making the payment for the admission, and recording the payment in a blockchain in the blockchain environment.

10. The computer-implemented method of claim 4, wherein the action comprises one or more of effecting an admission to a location, billing for the admission, making the payment for the admission, and recording the payment in a blockchain in the blockchain environment.

11. The computer-implemented method of claim 4, wherein sending instructions from the user device comprises one of scanning a barcode into a barcode reader and sending the transaction in a wireless transmission.

12. The computer-implemented method of claim 4, further comprising:
   responsive to storing the application in a storage of the device, creating a light node in the storage of the device and creating a full node in the blockchain environment.

\* \* \* \* \*